United States Patent [19]

Osada et al.

[11] Patent Number: 4,886,429
[45] Date of Patent: Dec. 12, 1989

[54] ELECTROMAGNETIC PUMP

[75] Inventors: Toshio Osada; Masaaki Tanabe, both of Tokyo, Japan

[73] Assignee: Man Design Co., Ltd., Tokyo, Japan

[21] Appl. No.: 218,962

[22] Filed: Jul. 14, 1988

[30] Foreign Application Priority Data

Jul. 17, 1987 [JP] Japan .............................. 62-109083[U]

[51] Int. Cl.$^4$ ........................ F04B 35/04; F04B 43/04; F04B 45/04
[52] U.S. Cl. .................................. 417/413; 417/418; 310/15
[58] Field of Search .................. 417/413, 417, 418; 310/15, 17; 355/68, 77, 302

[56] References Cited

U.S. PATENT DOCUMENTS

| 4,500,827 | 2/1985 | Merritt et al. | 310/15 X |
| 4,608,000 | 8/1986 | Tominaga | 417/413 |
| 4,626,720 | 12/1986 | Fukasaku et al. | 416/93 R X |

FOREIGN PATENT DOCUMENTS

| 56-077581 | 6/1981 | Japan | 417/413 |
| 62-070673 | 4/1987 | Japan | 417/413 |
| 62-113873 | 5/1987 | Japan | 417/417 |
| 62-126280 | 6/1987 | Japan | 417/413 |

Primary Examiner—Carlton R. Croyle
Assistant Examiner—Eugene L. Szczecina
Attorney, Agent, or Firm—Nixon & Vanderhye

[57] ABSTRACT

An electromagnetic pump comprising fluid operation chambers for discharging fluid to the outside; and electromagnet connected to an AC power source device for polarity switching for every half cycle of AC when energized; a permanent magent which moves together with the electromagnets; and a reciprocative shaft holding the permanent magnet, which reciprocates in the shaft direction when the electromagnet is energized. The width of a securement portion for the permanent magnet of the reciprocative shaft is relatively narrow compared to the other portions, and the permanent magnet consists of a pair of permanent magnet pieces bonded together by sandwiching the securement portion therebetween. The electromagnetic pump further comprises a fluid operation member for expanding or contracting the volume in the fluid operation chamber by the reciprocation movement of the reciprocative shaft so as to guide fluid out.

3 Claims, 4 Drawing Sheets

AC POWER SUPPLY UNIT

ELECTROMAGNETIC PUMP

BACKGROUND OF THE INVENTION

1. Field of the Invention

This invention relates to an electromagnetic pump utilized as means for increasing air pressure, e.g., a compressor, or means for reducing air pressure, e.g., a reducer or a vacuum pump.

2. Description of the Prior Art

Heretofore, there has been well known in the art an electromagnetic pump, which comprises an electromagnet connected to an AC power source for polarity switching for every half cycle, a reciprocative shaft assembly having a permanent magnet magnetically attracted and repelled by the electromagnet for every polarity switching thereof so as to reciprocate in directions corresponding to the magnetic attraction and repulsion, and a fluid operation chamber wherein the volume thereof increases and contracts with the reciprocation of the reciprocative shaft assembly. The reciprocative shaft assembly used for the prior art electromagnetic pump is as shown in FIGS. 1 and 2 and is disclosed in Japanese Utility Model Publication No. 56-42448.

The example of reciprocative shaft assembly 101 shown in FIG. 1, includes a metal shaft portion with screws 103 and 104 extending from the opposite ends thereof for mounting pump diaphragms. A substantially central portion of shaft portion 102 has two rectangular permanent magnet securement spaces 105 and 106, in which flat and elongate permanent magnets 107 and 108 are held and secured in position. Within this reciprocative shaft assembly 101, magnetic flux is generated around rectangular permanent magnet securement spaces 105 and 106 formed on metal shaft portion 102. A magnetic force from the large amount magnetic flux concentrated in the central portion of shaft portion 102 causes an eddy current to be generated which deteriorates the magnetic properties of the magnetic circuit consisting of the electromagnet and permanent magnets.

The example of reciprocative shaft assembly 201 shown in FIG. 2 includes metal shaft portion 202 with screws 203 and 204 extending from the opposite ends thereof for mounting pump diaphragms. A central portion of shaft portion 202 has large space 205 corresponding to the volume of three permanent magnets. Two permanent magnets 206 and 207 are snugly accommodated in the opposite end portions of space 205 and secured in position. In this example, since vacant space 205 occupies a central portion of space 205, and it has an effect of reducing the chances that an eddy current is formed therein.

However, since magnetic conduction between the poles of permanent magnets 206 and 207 is provided by shaft portion 202 of reciprocative shaft assembly 201 shown in FIG. 2, deterioration of the magnetic performance inevitably occurs. Further, since permanent magnets 206 and 207 are covered by shaft portion 202, the outer size and weight of reciprocative shaft assembly 201 is increased, thereby further deteriorating the start characteristics of the electromagnetic pump.

SUMMARY OF THE INVENTION

An object of the invention is to provide a highly efficient electromagnetic pump, which is free from generation of eddy current around a reciprocal shaft assembly with permanent magnets, can suppress heat generation from the reciprocal shaft assembly and eliminates magnetic conduction between the poles of two permanent magnets to prevent deterioration of magnetic characteristics and improve kinetic performance of the reciprocable shaft assembly.

To attain the above object of the invention, there is provided an electromagnetic pump with fluid operation chambers for forcing out fluid out to the outside, which comprises (a) an electromagnet connected to an AC power source device for polarity switching for every half cycle of AC when energized;

(b) a reciprocable shaft assembly including a permanent magnet co-operative with said electromagnet and a shaft member supporting said permanent magnet, said reciprocable shaft assembly being reciprocated in the axial direction when said electromagnet is energized, the width of a securement section in said shaft member, to which said permanent magnet is secured, having a reduced width compared to the rest of said shaft member, said permanent magnet consisting of a pair of permanent magnet halves bonded together by sandwiching said securement section; and (c) fluid operation member for causing enlargement and contraction of said fluid operation chamber with the reciprocation of said reciprocable shaft assembly to force out fluid.

With the electromagnetic pump according to the invention, the reciprocable shaft assembly comprises a shaft member including a magnet securement section having a reduced width compared to the rest of the shaft member, and at least one permanent magnet consisting of a pair of permanent magnet halves bonded together by sandwiching the securement section. For this reason, there is no possibility of generation of magnetism within the reciprocable shaft, and it is possible to prevent generation of eddy current due to the magnetic flux and accompanying heat generation. Besides, since permanent magnet poles adjacent to one another in the axial direction of the reciprocable shaft assembly are never in magnetic conduction, the magnetic performance is never deteriorated. Therefore, it is possible to improve the kinetic performance of the reciprocable shaft assembly and obtain efficient pump operation.

DETAILED DESCRIPTION OF THE PREFERRED EMBODIMENTS

Figure 1:
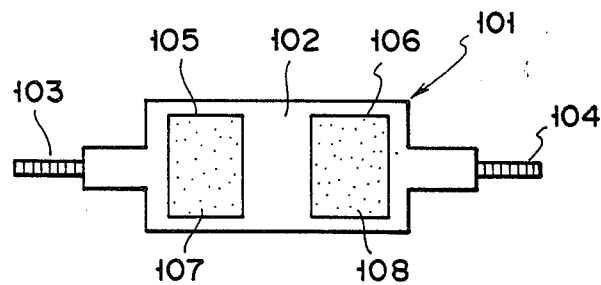
FIGS. 1 and 2 are plan views showing reciprocable shaft assemblies of prior art electromagnetic pumps.
Figure 2:
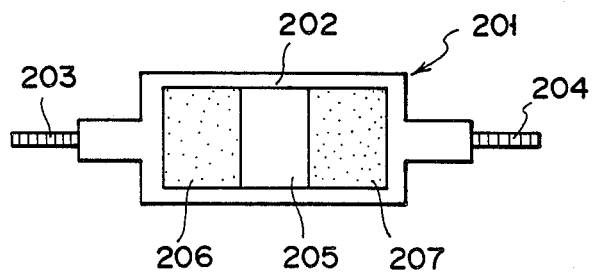
Figure 3:
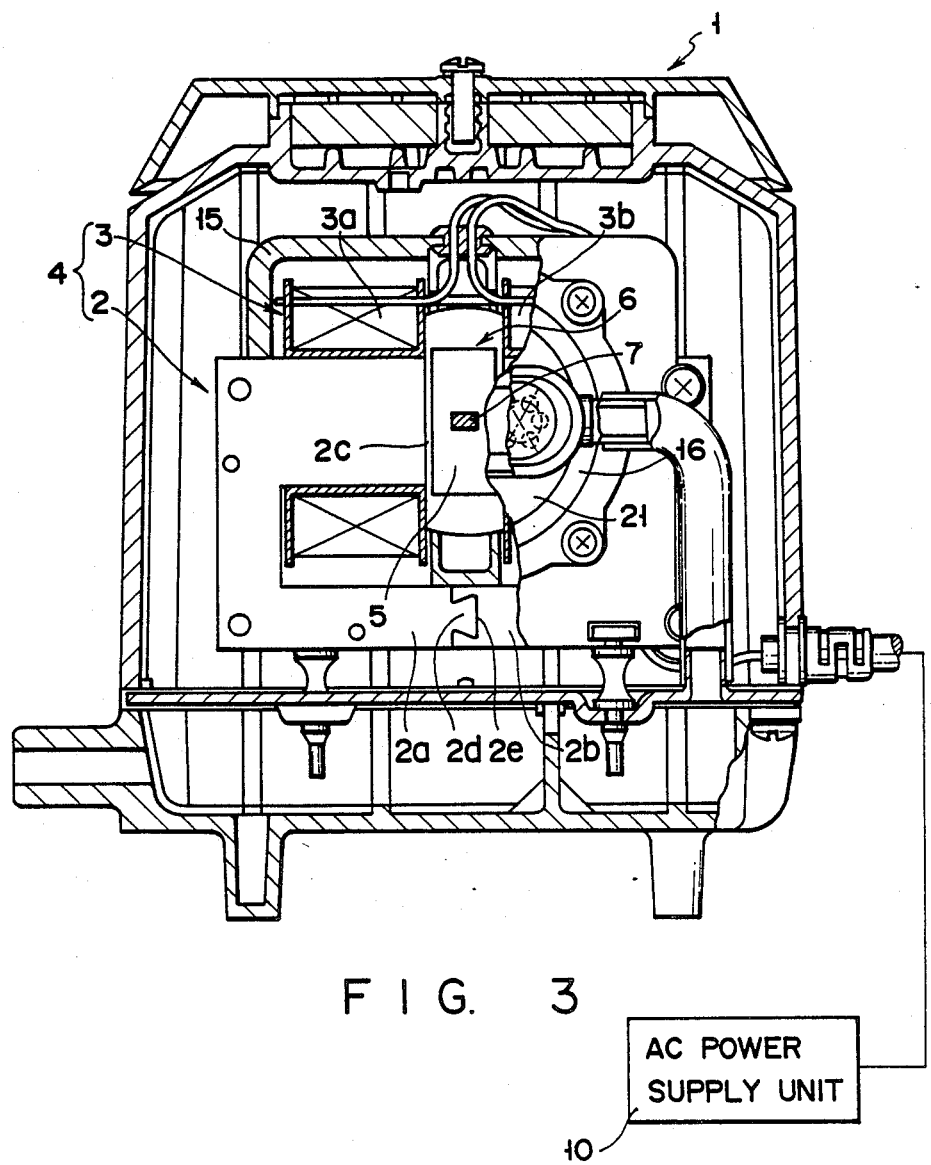
FIG. 3 is a front sectional view showing an embodiment of the electromagnetic pump according to the invention.
Figure 4:
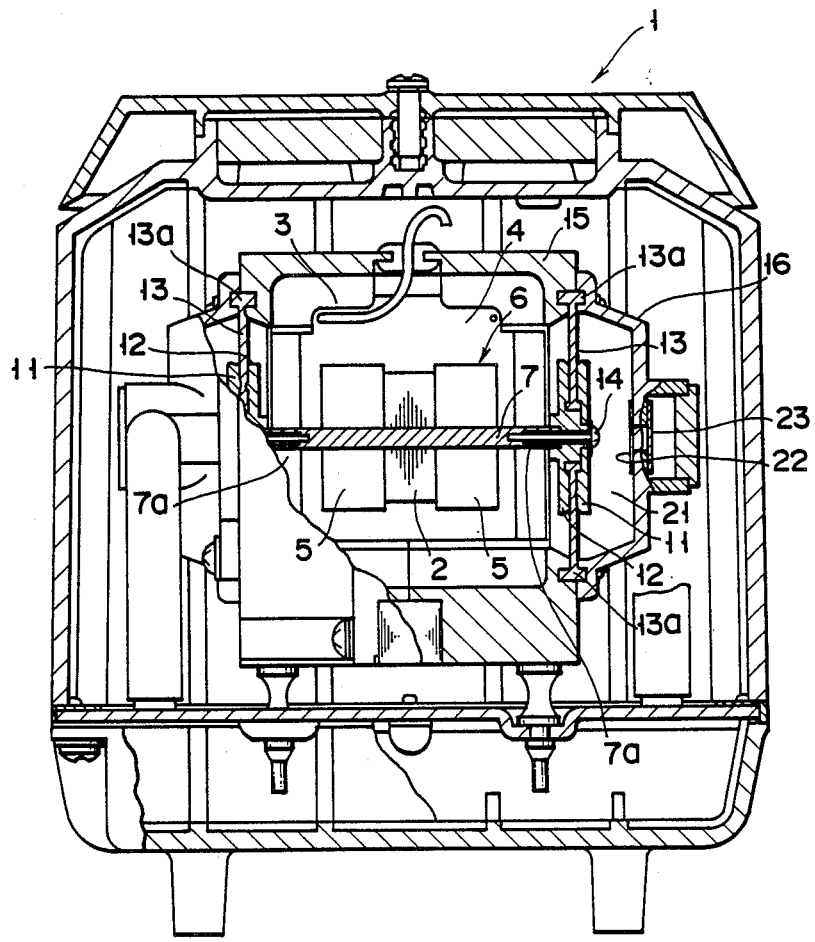
FIG. 4 is a side sectional view showing an embodiment of the electromagnetic pump according to the invention.
Figure 5:
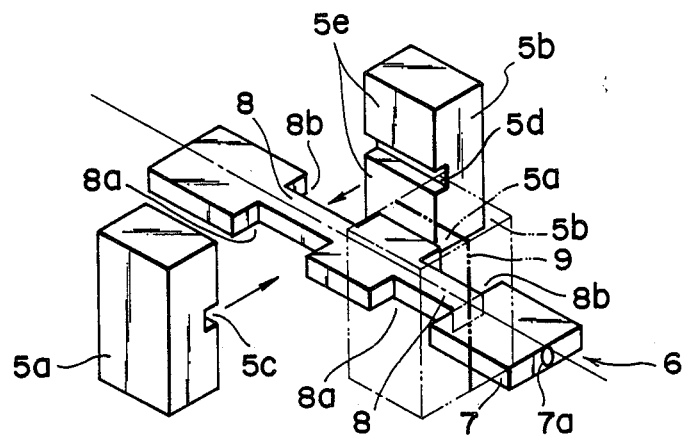
FIG. 5 is an exploded perspective view showing a reciprocable shaft assembly of the electromagnetic pump shown in FIGS. 3 and 4.

FIGS. 3 to 5 show an embodiment of the invention. As shown in FIG. 3, electromagnetic pump 1 according to the invention includes electromagnet 4 having core 2 and coil 3. Core 2 is of a substantially turned-down C-shape and consists of a pair of turned-down U-shaped core halves 2a and 2b disposed face-to-face. Gap 2c is formed between opposing ends of the upper portions of core halves 2a and 2b. Opposing ends of the lower portions of core halves 2a and 2b have engagement portions 2d and 2e, and core halves 2a and 2b are coupled together by engagement portions 2d and 2e. Coil 3 includes first coil 3a wound on the upper portion of core half 2a and second coil 3b wound on the upper portion of the other core half 2b. Electromagnet 4 is connected to AC power source 10 and has a polarity which is switched for very half cycle of the AC.

Reciprocative shaft assembly 6 is located in gap 2c provided in core 2. Reciprocative shaft assembly 6 consists of two flat elongate permanent magnets 5 (see FIG. 4) disposed to be spaced-apart from one another in a repulsion such that alternate attraction and repulsion are repeatedly produced for every polarity switching of electromagnet 4. Thus, reciprocatine shaft assembly 6 is caused to reciprocate from left to right in FIG. 4 by the attraction and repulsion between electromagnet 4 and permanent magnets 5.

Now, reciprocative shaft assembly 6 will be described.

Reciprocative shaft assembly 6 is structured as shown in FIG. 5 and consists of elongate shaft member 7 having a rectangular sectional shape and two flat elongate permanent magnets 5 mounted on member 7. Shaft member 7 has reduced-width permanent magnet securement or holding sections 8 adjacent to the front and rear ends of its central portion. To each securement section 8 are secured two permanent magnet pieces 5a and 5b which constitute permanent magnet 5 and have a predetermined thickness when coupled together. In this embodiment, permanent magnet 5 is secured to securement portion 8 by forming the opposing surfaces 5e of permanent magnet pieces 5a and 5b with notches 5c and 5d to be fitted on notches 8a and 8b formed along opposite edges of securement section 8, abutting permanent magnet pieces 5a and 5b with the opposite sides of securement portion 8 (as shown by imaginary lines in FIG. 5), engaging notches 8a and 5c with one another and notches 8b and 5d with one another, and plane bonding together abutting surfaces 5e of permanent magnets 5a and 5d with adhesive 9 (as shown by a thick imaginary line in FIG. 5). Further, reciprocative shaft assembly 6 has female threads 7a formed on the opposite ends of shaft member 7

As shown in FIG. 4, a central portion of diaphragm 13 clamped between diaphragm mounting plates 11 and 12 is secured to the end of reciprocative shaft assembly 6 by screwing bolt 14 into female thread 7a. Diaphragm 13 has its edge 13a hermetically secured between electromagnet casing 15 and fluid operation chamber casing 16.

Fluid operation chamber casing 16 and diaphragm 13 form a fluid operaton chamber 21, the volume of which is increased and reduced with the reciprocation of reciprocative shaft assembly 6. Fluid operation casing 16 is provided with air suction and discharge valves 22 and 23 mounted side by side in a direction perpendicular to the plane of FIG. 4.

In electromagnetic pump 1 haing the above construction, when an AC current is supplied to coil 3 of electromagnet 4, the polarity thereof is switched for every half cycle of the AC, so that two permanent magnets 5 repeatedly provide alternate attraction and repulsion forces in accordance with the polarity switching of electromagnet 4. With this action of attraction and repulsion, reciprocative shaft assembly 6 is reciprocated in the axial direction to drive diaphragms 13 forming side walls of two fluid operation chambers 21. Thus, of the two fluid operation chambers, one is enlarged while the other is contracted. In other words, fluid operation chambers 21 are repeatedly and alternately enlarged and contracted. When each chamber is enlarged, suction valve 22 is opened to admit external fluid into chamber 21. When the chamber is contracted, discharge valve 23 is opened to discharge fluid in chamber 21 to the outside. This mechanism has a function of a vacuum pump.

With the electromagnetic pump according to the invention, the poles of permanent magnets 5 are not in magnetic conduction, that is, no magnetic flux due to magnetic condition is produced. It is thus possible to obtain an efficient pump operation without heat generation and also without deterioration of the magnetic characteristics of permanent magnets 5. Further, since the outer shape of reciprocative shaft assembly 6 is defined by the outer shape of permanent magnets 5, it is possible to minimize the shape of reciprocative shaft 6. Further, since no heat is generated, no deterioration occurs in the adhesive 9 bonding together two flat elongate permanent magnet halves 5a and 5b to form each permanent magnet 5, and also there is no possibility that adhesive 9 will adversely effect the magnetic properties of the permanent magnets.

What is claimed is:

1. An electromagnetic pump comprising:
   fluid operation chambers into which fluid is sequentially admitted and discharged;
   an electromagnet connected to an AC power source device for polarity switching for every half cycle of AC when energized;
   a reciprocative shaft, including at least one permanent magnet which moves between opposing magnetic poles of said electromagnet crossing the magnetic line of force, being reciprocated parallel with said magnetic poles when said electromagnet is energized;
   a diaphragm attached at either end of said reciprocative shaft and partially defining each of said fluid operation chambers, for admitting and discharging fluid by enlarging or contracting the volume of said chamber as said reciprocative shaft reciprocates;
   wherein said reciprocative shaft comprises an elongated, substantially flat member, provided with at least one narrow portion for holding said permanent magnet and a pair of notch portions formed at both sides opposing each other in the direction of the width of said shaft; and
   said at least one permanent magnet comprising a pair of permanent magnet pieces whose thickness is approximately half of the width of said shaft, and wherein opposing faces of the permanent pieces have grooves formed therein, engaged with the narrow portions of said reciprocative shaft, and wherein said permanent magnet pieces are bonded together therewith.

2. An electromagnetic pump according to claim 1, wherein a pair of permanent magnet holding portions are provided on said reciprocative shaft, located distant from each other in the shaft direction, and each formed of a narrow portion defined by a pair of opposed notch portions, and wherein two permanent magnets are provided whose polarity differs from each other, one of said permanent magnets being held at said each holding portion.

3. An electromagnetic pump according to claim 1, and further comprising a first valve means mounted on a side wall of said fluid operation chamber, for guiding fluid into the fluid operation chamber from the outside, and a second valve member for discharging fluid in said chamber to the outside.

* * * * *